United States Patent
Wu et al.

(10) Patent No.: US 11,170,821 B2
(45) Date of Patent: Nov. 9, 2021

(54) VIDEO MANAGEMENT METHOD AND APPARATUS, IMAGE CAPTURING DEVICE, AND STORAGE MEDIUM

(71) Applicant: BOE Technology Group Co., Ltd., Beijing (CN)

(72) Inventors: Ying Wu, Beijing (CN); Xiangdong Yang, Beijing (CN); Xiying Zhang, Beijing (CN); Xingxing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 294 days.

(21) Appl. No.: 16/364,814

(22) Filed: Mar. 26, 2019

(65) Prior Publication Data

US 2019/0355394 A1 Nov. 21, 2019

(30) Foreign Application Priority Data

May 18, 2018 (CN) .......................... 201810479508.2

(51) Int. Cl.
*G11B 27/34* (2006.01)
*G06K 9/00* (2006.01)
(Continued)

(52) U.S. Cl.
CPC .............. *G11B 27/34* (2013.01); *B60R 11/04* (2013.01); *G06K 9/00744* (2013.01);
(Continued)

(58) Field of Classification Search
CPC ........... G06K 9/00744; G06K 9/00765; G06K 9/00791; G11B 27/34; G11B 27/031;
(Continued)

(56) References Cited

U.S. PATENT DOCUMENTS 6,163,338 A * 12/2000 Johnson ................. H04N 7/188
348/143
6,407,768 B1 6/2002 Ishikawa
(Continued)

FOREIGN PATENT DOCUMENTS

CN 101039416 A 9/2007
CN 101789123 A 7/2010
(Continued)

OTHER PUBLICATIONS

First office action of Chinese application No. 201810479508.2 dated Apr. 27, 2020.
(Continued)

*Primary Examiner* — Gelek W Topgyal
(74) *Attorney, Agent, or Firm* — Fay Sharpe LLP

(57) ABSTRACT

A video management method and apparatus, image capturing device and storage medium are provided. The video management method includes: obtaining a first driving record video from storage space when a capacity of available space of the storage space is less than a target capacity threshold, wherein the storage space stores at least one driving record video of a target vehicle, and the first driving record video includes a plurality of video frames; and deleting at least one video frame from the video frames included in the first driving record video to obtain a second driving record video. Object captured in the first driving record video are in the second driving record video, so that information safety of users is ensured.

16 Claims, 6 Drawing Sheets

(51) Int. Cl.
*H04N 21/845* (2011.01)
*B60R 11/04* (2006.01)

(52) U.S. Cl.
CPC ....... *G06K 9/00765* (2013.01); *H04N 21/845* (2013.01); *B60R 2300/10* (2013.01)

(58) Field of Classification Search
CPC .... H04N 21/845; H04N 19/423; H04N 19/48; H04N 21/41422; H04N 21/44008; H04N 21/4424; H04N 21/4435; H04N 5/23229; H04N 5/76
See application file for complete search history.

(56) References Cited

U.S. PATENT DOCUMENTS

| | | | |
|---|---|---|---|
| 2005/0030379 A1* | 2/2005 | Luskin | B60R 1/00 348/148 |
| 2007/0220568 A1 | 9/2007 | Fukasawa | |
| 2012/0014659 A1* | 1/2012 | Hugosson | H04N 7/188 386/228 |
| 2012/0105635 A1* | 5/2012 | Erhardt | G08B 13/19647 348/148 |
| 2014/0049646 A1* | 2/2014 | Nix | B60W 10/18 348/148 |
| 2014/0098228 A1* | 4/2014 | Plante | H04N 7/181 348/148 |
| 2015/0169962 A1 | 6/2015 | Liu et al. | |
| 2015/0324636 A1* | 11/2015 | Bentley | A63F 13/00 386/227 |
| 2016/0050356 A1* | 2/2016 | Nalepka | G06K 9/00791 348/148 |
| 2016/0277759 A1* | 9/2016 | Edpalm | H04N 19/162 |

FOREIGN PATENT DOCUMENTS

| | | |
|---|---|---|
| CN | 102145688 A | 8/2011 |
| CN | 102724589 A | 10/2012 |
| CN | 103347167 A | 10/2013 |
| CN | 104717457 A | 6/2015 |
| CN | 105023307 A | 11/2015 |
| CN | 105354896 A | 2/2016 |
| CN | 106991736 A | 7/2017 |
| CN | 107564130 A | 1/2018 |
| CN | 107566768 A | 1/2018 |
| CN | 107800988 A | 3/2018 |

OTHER PUBLICATIONS

Second office action of Chinese application No. 201810479508.2 dated Feb. 1, 2021.

* cited by examiner

VIDEO MANAGEMENT METHOD AND APPARATUS, IMAGE CAPTURING DEVICE, AND STORAGE MEDIUM

This application claims priority to Chinese Patent Application No. 201810479508.2, filed on May 18, 2018 and titled "VIDEO DATA MANAGEMENT METHOD AND APPARATUS, AND VIDEO RECORDING DEVICE", the entire contents of which are incorporated herein by reference.

TECHNICAL FIELD

The present disclosure relates to a video management method and apparatus, an image capturing device and a storage medium.

BACKGROUND

With the rapid development of information technology, image capturing devices have been applied more and more widely in people's daily life. For example, an image capturing device may be disposed in the rearview mirror of a vehicle. During the travelling of the vehicle, the image capturing device disposed in the rearview mirror of the vehicle can capture images of the vehicles, pedestrians and the like on the road, and hence realizes the function of driving recording.

SUMMARY

Embodiments of the present disclosure provide a video management method and apparatus, an image capturing device, and a storage medium.

In a first aspect, there is provided a video management method, including: obtaining a first driving record video from storage space when a capacity of available space of the storage space is less than a target capacity threshold, wherein the storage space stores at least one driving record video of a target vehicle, and the first driving record video includes a plurality of video frames; and deleting at least one video frame from the plurality of video frames included in the first driving record video to obtain a second driving record video, wherein objects captured in the first driving record video are in the second driving record video.

Optionally, deleting at least one video frame from the plurality of video frames included in the first driving record video includes: dividing the first driving record video into n video segments, wherein within a recording time period of each of the video segments, a travel distance of the target vehicle is less than or equal to a target distance threshold, the target distance threshold is a vehicle critical travel distance which ensures that objects captured in the first driving record video are in the second driving record video, and n is a positive integer greater than one; and for each of the video segments, deleting at least one video frame from the video frames included in the video segment when the number of video frames included in the video segment is greater than a target image frame number threshold, the number of video frames included in the video segment after deleting the video frame being equal to the target image frame number threshold.

Optionally, dividing the first driving record video into n video segments according to the travel speed of the target vehicle within the target time period and the target distance threshold includes: determining, according to a total travel distance s of the target vehicle within a recording time period of the first driving record video and the target distance threshold $s_0$, the number of segments n, wherein n satisfies: $n=\lceil s/s_0 \rceil$ or $n=\lfloor s/s_0 \rfloor$, $\lceil \ \rceil$ indicates rounding up to an integer, and $\lfloor \ \rfloor$ indicates rounding down to an integer; determining, according to the target distance threshold $s_0$, a travel distance range that each of the n video segments corresponds to, wherein a travel distance range that an $i^{th}$ video segment corresponds to is $((i-1) \times s_0, i \times s_0]$, and i is a positive integer less than or equal to n; for each video frame included in the first driving record video, determining a vehicle travel distance that the video frame corresponds to, wherein the vehicle travel distance that the video frame corresponds to is the travel distance of the target vehicle within a time period between a start recording time of the first vehicle record video and a recording time of the video frame; and for each video frame included in the first driving record video, grouping the video frame into the $i^{th}$ video segment when it is detected that a vehicle travel distance that the video frame corresponds to is within the travel distance range that the $i^{th}$ video segment corresponds to.

Optionally, the target image frame number threshold is two.

Optionally, deleting at least one video frame from the video frames included in the video segment includes: deleting at least one video frame, except a first video frame and a last video frame, from the video frames included in the video segment.

Optionally, deleting at least one video frame from the video frames included in the video segment includes: randomly deleting at least one video frame from the video frames included in the video segment.

Optionally, prior to deleting at least one video frame from the plurality of video frames included in the first driving record video, the method further includes: obtaining a reference video from the at least one driving record video; obtaining a first video frame and a second video frame adjacent to each other from the reference video, the first video frame and the second video frame including the same target object; obtaining the travel distance of the target vehicle with respect to the target object within a time period between a recording time of the first video frame and a recording time of the second video frame; and setting the travel distance of the target vehicle with respect to the target object as the target distance threshold.

Optionally, an ordinate of the target object in an image coordinate system of the first video frame is less than a first coordinate threshold; an ordinate of the target object in an image coordinate system of the second video frame is greater than a second coordinate threshold; and the second coordinate threshold is greater than the first coordinate threshold.

Optionally, obtaining the travel distance of the target vehicle with respect to the target object within the time period between the recording time of the first video frame and the recording time of the second video frame includes: obtaining, according to a coordinate value of the target object in the image coordinate system of the first video frame, a first depth value of the target object in a world coordinate system at the recording time of the first video frame; obtaining, according to a coordinate value of the target object in the image coordinate system of the second video frame, a second depth value of the target object in the world coordinate system at the recording time of the second video frame; and setting an absolute value of a difference between the first depth value and the second depth value as the travel distance of the target vehicle with respect to the target object within the time period between the recording time of the first video frame and the recording time of the second video frame.

Optionally, a target driving record video to which an incompressible identifier is added is stored in the storage space; and obtaining the first driving record video from the storage space includes: obtaining the first driving record video from driving record videos except the target driving record video in the storage space.

Optionally, prior to obtaining the first driving record video from the storage space when the capacity of available space of the storage space is less than the target capacity threshold, the method further includes: detecting, during recording of the driving record video, whether the capacity of available space of the storage space is less than the target capacity threshold.

In a second aspect, there is provided a video management apparatus, including: one or more processors; and a memory, wherein the memory stores one or more programs configured to be executed by the one or more processors, and the one or more programs include instructions for performing the following operations: obtaining a first driving record video from storage space when a capacity of available space of the storage space is less than a target capacity threshold, wherein the storage space stores at least one driving record video of a target vehicle, and the first driving record video includes a plurality of video frames; and deleting at least one video frame from the plurality of video frames included in the first driving record video to obtain a second driving record video, wherein objects captured in the first driving record video are in the second driving record video.

Optionally, wherein the one or more programs include instructions for performing the following operations: dividing the first driving record video into n video segments, wherein within a recording time period of each of the video segments, a travel distance of the target vehicle is less than or equal to a target distance threshold, the target distance threshold is a vehicle critical travel distance which ensures that the objects captured in the first driving record video are in the second driving record video, and n is a positive integer greater than one; and for each of the video segments, deleting at least one video frame from the video frames included in the video segment when the number of video frames included in the video segment is greater than a target image frame number threshold, the number of video frames included in the video segment after deleting the video frame being equal to the target image frame number threshold.

Optionally, the one or more programs include instructions for performing the following operations: determining, according to a total travel distance s of the target vehicle within a recording time period of the first driving record video and the target distance threshold $s_0$, the number of segments n, wherein n satisfies: $n=\lceil s/s_0 \rceil$ or $n=\lfloor s/s_0 \rfloor$, $\lceil \ \rceil$ indicates rounding up to an integer, and $\lfloor \ \rfloor$ indicates rounding down to an integer; determining, according to the target distance threshold $s_0$, a travel distance range that each of the n video segments corresponds to, wherein a travel distance range that the $i^{th}$ video segment correspond to is $((i-1) \times s_0, i \times s_0]$, and i is a positive integer less than or equal to n; for each video frame included in the first driving record video, determining a vehicle travel distance that the video frame corresponds to, wherein the vehicle travel distance that the video frame corresponds to is a travel distance of the target vehicle within a time period between a start recording time of the first vehicle record video and a recording time of the video frame; and for each video frame included in the first driving record video, grouping the video frame into the $i^{th}$ video segment when it is detected that a vehicle travel distance that the video frame corresponds to is within the travel distance range that the $i^{th}$ video segment corresponds to.

Optionally, the target image frame number threshold is two.

Optionally, wherein the one or more programs include instructions for performing the following operations: deleting at least one video frame, except a first video frame and a last video frame, from the video frames included in the video segment.

Optionally, wherein the one or more programs include instructions for performing the following operations: randomly deleting at least one video frame from the video frames included in the video segment.

Optionally, a target video to which an incompressible identifier is added is stored in the storage space; and the one or more programs include instructions for performing the following operation: obtaining the first driving record video from the videos except the target video in the storage space.

Optionally, the one or more programs further include instructions for performing the following operations: obtaining a reference video from the at least one driving record video; obtaining a first video frame and a second video frame adjacent to each other from the reference video, the first video frame and the second video frame including the same target object; obtaining a travel distance of the target vehicle with respect to the target object within a time period between a recording time of the first video frame and a recording time of the second video frame; and setting the travel distance of the target vehicle with respect to the target object as the target distance threshold.

Optionally, an ordinate of the target object in an image coordinate system of the first video frame is less than a first coordinate threshold; an ordinate of the target object in an image coordinate system of the second video frame is greater than a second coordinate threshold; and the second coordinate threshold is greater than the first coordinate threshold.

Optionally, the one or more programs include instructions for performing the following operations: obtaining, according to a coordinate value of the target object in the image coordinate system of the first video frame, a first depth value of the target object in a world coordinate system at the recording time of the first video frame; obtaining, according to a coordinate value of the target object in the image coordinate system of the second video frame, a second depth value of the target object in the world coordinate system at the recording time of the second video frame; and setting an absolute value of a difference between the first depth value and the second depth value as the travel distance of the target vehicle with respect to the target object within the time period between the recording time of the first video frame and the recording time of the second video frame.

Optionally, wherein the one or more programs include instructions for performing the following operations: obtaining the first driving record video from driving record videos except the target driving record video in the storage space.

Optionally, the one or more programs further include instructions for performing the following operations: detecting, during recording of the driving record video, whether the capacity of available space of the storage space is less than the target capacity threshold.

In a third aspect, there is provided an image capturing device, including: the video management apparatus in any of the second aspect, and an image capturing component.

In a fourth aspect, there is provided a computer-readable storage medium, having stored thereon instructions that, when executed on a processor of the computer, cause the processor to perform the video management method in any of the first aspect.

DETAILED DESCRIPTION

Figure 1:
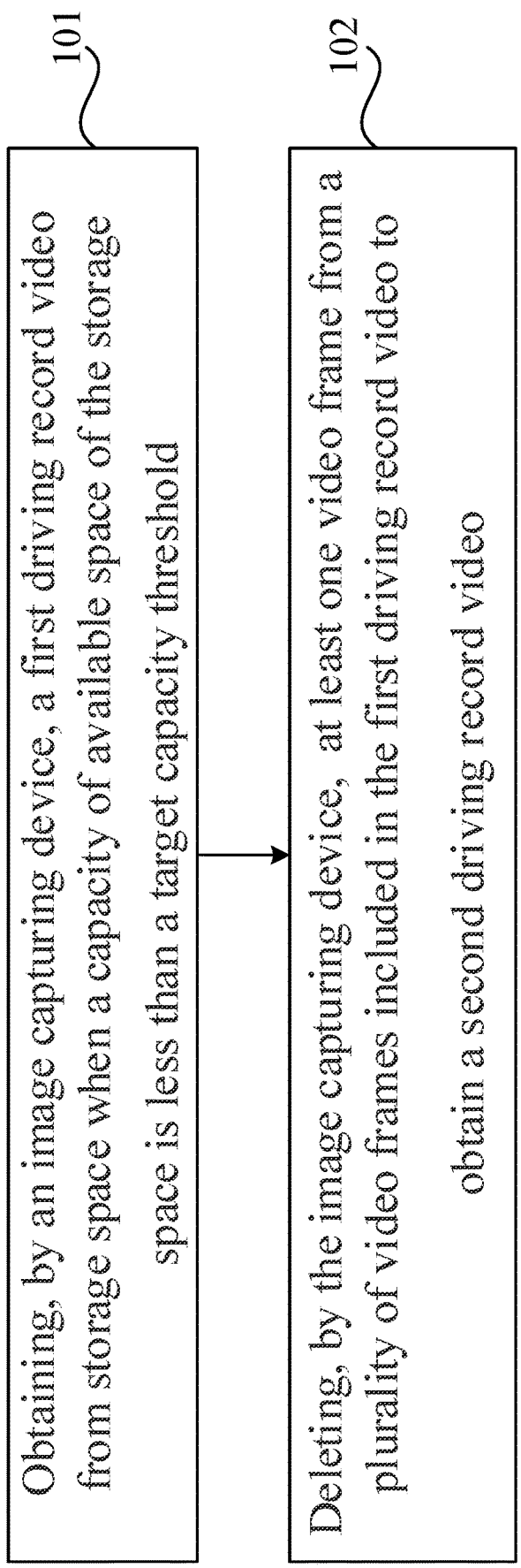
FIG. 1 is a flow chart of a video management method according to an embodiment of the present disclosure.

In order to clearly present the principles and advantages of the present disclosure, the embodiments of the present disclosure will be further described in detail below with reference to the accompanying drawings.

At present, the image capturing device has been applied more and more widely in people's daily life. For example, in a typical application, the image capturing device may be disposed in the rearview mirror of a vehicle, and the rearview mirror of the vehicle provided with the image capturing device can realize the function of driving recording.

During recording of the video by the image capturing device, the image capturing device can store the recorded video in a storage space, for example, the storage space may be a Secure Digital Memory Card (SD card) or the like.

Generally, during recording of the video, if the image capturing device requires higher fluency and image quality definition on recorded video data, there is a possibility that the capacity of the storage space is insufficient. "The capacity of the storage space is insufficient" means that the capacity of available space of the storage space is less than a certain threshold.

In the related art, in the case where the capacity of the storage space is insufficient, in order to ensure that the driving record video being recorded can be stored normally, and in order to prevent the driving record video being recorded from being lost, some videos stored in the storage space may be deleted so as to increase the capacity of available space of the storage space. However, this would likely result in that some important videos in the storage space are lost, which poses a serious threat to user information security.

In an embodiment of the present disclosure, there is provided a video management method. With the video management method: a first driving record video may be obtained from storage space when a capacity of available space of the storage space is less than a target capacity threshold, and at least one video frame may be deleted from a plurality of video frames included in the first driving record video to obtain a second driving record video. Objects captured in the first driving record video are in the second driving record video. Thus, on one hand, the capacity occupied by the first driving record video in the storage space can be reduced by deleting at least one video frame of the first driving record video, so as to increase the capacity of available space of the storage space. On the other hand, the object captured in the first driving record video is prevented from being lost in the second driving record video, so that user information safety is ensured.

It should be noted that the image capturing device according to the embodiment of the present disclosure may include, but is not limited to, the following devices: a driving recorder, a smart phone, a computer, a monitoring device, and the like. Moreover, the specific types, models, and the like of the image capturing apparatus are not limited in the embodiment of the present disclosure.

FIG. 1 is a flow chart of a video management method according to an embodiment of the present disclosure. The video management method may be applied to an image capturing device. As shown in FIG. 1, the video management method includes the following working processes.

In step 101, the image capturing device obtains a first driving record video from storage space when the capacity of available space of the storage space is less than a target capacity threshold.

The storage space stores at least one driving record video of a target vehicle, and the first driving record video includes a plurality of video frames.

The driving record video of the target vehicle refers to the video of the environment in which the target vehicle is, captured by the image capturing device during the travel of the target vehicle, wherein the environment in which the target vehicle is may include roads, other vehicles on the roads, and pedestrians on the roads, etc.

In step 102, the image capturing device deletes at least one video frame from a plurality of video frames included in the first driving record video to obtain a second driving record video.

Objects captured in the first driving record video are in the second driving record video. That is, all objects captured in the first driving record video are recorded in the second driving record video.

In summary, according to the video management method provided in the embodiments of the present disclosure, a first driving record video is obtained from the storage space when the capacity of available space of the storage space is less than the target capacity threshold, and at least one video frame is deleted from a plurality of video frames included in the first driving record video to obtain the second driving record video. Objects captured in the first driving record video are in the second driving record video. Thus, on one hand, the capacity occupied by the first driving record video in the storage space can be reduced by deleting at least one video frame of the first driving record video, so as to increase the capacity of available space of the storage space. On the other hand, the object captured in the first driving record video is prevented from being lost in the second driving record video, so that user information safety is ensured.

Figure 2:
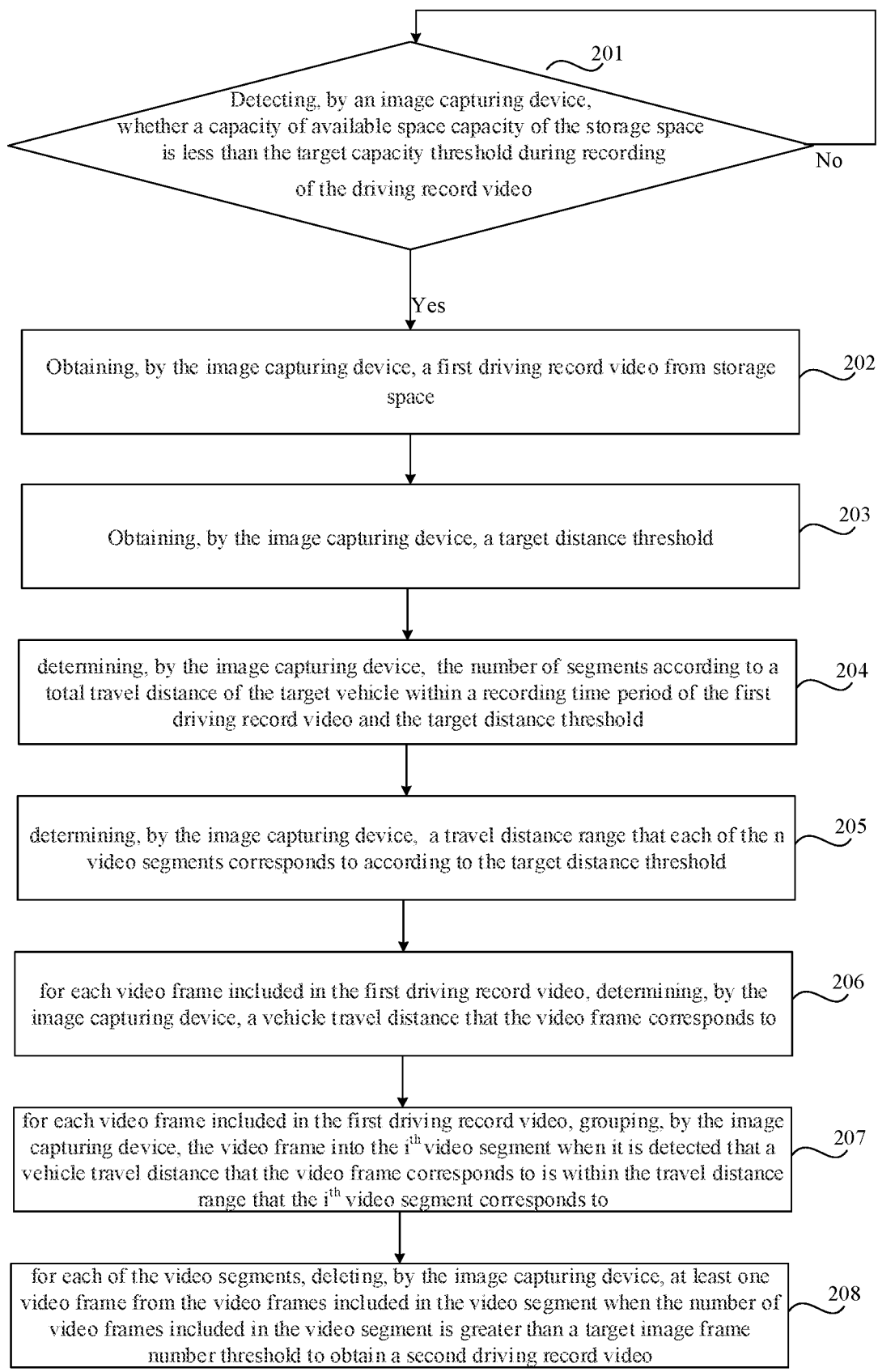
FIG. 2 is a flow chart of another video management method according to an embodiment of the present disclosure.

FIG. 2 is a flow chart of another video management method according to an embodiment of the present disclosure. The video management method may be applied to an image capturing device. As shown in FIG. 2, the video management method includes the following working processes.

In step 201, during recording of a driving record video, the image capturing device detects whether a capacity of available space of storage space is less than a target capacity threshold.

In the embodiment of the present disclosure, the image capturing device may detect the capacity of available space of the storage space in real time during the recording of the driving record video, and detect whether the capacity of available space is less than the target capacity threshold. When the capacity of available space is not less than the target capacity threshold, the image capturing device may continue to perform step 201. When the capacity of available space is less than the target capacity threshold, the image capturing device may determine that the storage space capacity is insufficient. In order to ensure that the driving record video being currently recorded can be normally stored, the image capturing device may perform step 202.

The target capacity threshold described in the embodiments of the present disclosure may be preset by a technician or may be set by a user. For example, the target capacity threshold may be 5% of the total capacity of the storage space, or the target capacity threshold may be 500M, etc., which is not specifically limited in the embodiments of the present disclosure.

In step 202, the image capturing device obtains a first driving record video from the storage space.

In the embodiments of the present disclosure, when the image capturing device determines that the capacity of available space of the storage space is less than the target capacity threshold during recording of the driving record video (the recorded driving record video may be the driving record video of a target vehicle). That is, in the case where there is insufficient storage space capacity during recording of the driving record video, the image capturing device may compress some videos in the storage space (the compression process is described in the following steps) so as to increase the capacity of available space of the storage space, thereby ensuring that the driving record video being recorded can be stored normally. Compression refers to deleting at least one video frame in the video to reduce the capacity occupied by the video in the storage space.

In order to perform the technical process of video compression in the subsequent steps, in step 202, the image capturing device may obtain the first driving record video from the storage space. As described above, at least one driving record video of the target vehicle is stored in the storage space. Thus, in step 202, the first driving record video obtained by the image capturing device is one of the at least one driving record video.

The embodiments of the present disclosure provide at least two ways of obtaining the first driving record video, and three of them will be described below.

The first way is to obtain the first driving record video according to the time sequence of the recording of the driving record videos.

Optionally, the image capturing device may preferentially obtain the driving record video with the preceding recording time in the storage space as the first driving record video. For example, when the storage space stores the driving record video recorded in May 2017 and the driving record video recorded in June 2017, the image capturing device may preferentially obtain the driving record video recorded in May 2017 as the first driving record video.

The second way is to obtain the first driving record video according to the numbering sequence of the driving record videos.

For example, the storage space stores three driving record videos which are numbered as 01, 02, and 03, respectively. The image capturing device may obtain the driving record video numbered as 01 as the first driving record video according to the numbering sequence.

The third way is to obtain the first driving record video through the hierarchical sequence of folders storing the driving record videos.

Exemplarily, the hierarchical sequence of the folders may be established according to path length, time length, time sequence, or the like. The path length may refer to the length of the storage path of the folder. The time length may refer to the length of the recording duration of the driving record video stored in the folder. The time may refer to the creation time of the folder.

For example, when the hierarchical sequence of the folders is the sequence of paths from short to long, the imaging capturing device may obtain the driving record video in the folder with the shortest path as the first driving record video according to the sequence. When the hierarchical sequence of the folders is the sequence of time from long to short, the imaging capturing device may obtain the driving record video in the folder with the longest recording duration as the first driving record video according to the sequence. When the hierarchical sequence of the folders is the sequence of time from far to near, the imaging capturing device may obtain the driving record video in the folder having the furthest creation time (i.e., the earliest creation time) as the first driving record video according to the sequence.

It should be noted that, in some possible cases, the storage space may store some important driving record videos. In order to prevent these important driving record videos from being compressed, the user can trigger a marking instruction for the important driving record videos through a specified operation. After receiving the marking instruction, the image capturing device can add incompressible identifiers to these driving record videos. For the convenience of explanation, the driving record video to which the incompressible identifier is added is referred to as the target driving record video below.

Since the target driving record video is important and cannot be compressed, the first driving record video obtained in step 202 may be a driving record video except the target driving record video in the storage space.

In step 203, the image capturing device obtains a target distance threshold.

The target distance threshold is a critical travel distance of the vehicle which ensures that objects captured in the video before being compressed are in the video after being compressed. "Objects captured in the video before being compressed are in the video after being compressed" means that each object captured in the video before being compressed is recorded in the video after being compressed. In the embodiments of the present disclosure, the video before being compressed refers to the first driving record video, and the video after being compressed refers to the second driving record video described below.

Generally, if the same object is not stored in two adjacent video frames in the video before being compressed, it can be deemed that the object captured in the video before compression will be lost after the two adjacent video frames are compressed. For example, if video frame A in the video before being compressed includes only pedestrian r1 and vehicle c1, while video frame B adjacent to the video frame A includes only pedestrian r2 and vehicle c2, the video obtained after compressing the video frame A and the video frame B likely loses some pedestrians or vehicles captured in the video before being compressed.

Conversely, if the same object is always stored in any two adjacent video frames in the video before being compressed, it can be deemed that the video obtained after compressing the any two adjacent video frames will not lose the object captured in the video before being compressed.

When the same object included in two adjacent video frames (the video frame A and the video frame B) in the video before being compressed is at the periphery (the position just entering the picture) in the video frame A, and is also at the periphery (the position just going out of the picture) in the video frame B, it can be critically ensured that the video obtained after compressing the two video frames does not lose the object captured in the video before being compressed.

The position just entering the picture in the video frame may refer to the position at the top of the video frame in the extending direction of the vertical axis (also referred to as the v-axis or the y-axis) in the image coordinate system, and the position just going out of the picture may refer to the position at the bottom of the video frame in the extending direction of the vertical axis. Alternatively, the position just entering the picture in the video frame may refer to the position at the bottom of the video frame in the extending direction of the vertical axis, and the position just going out of the picture may refers to the position at the top of the video frame in the extending direction of the vertical axis.

The origin of the image coordinate system of each video frame may be a point at the upper left corner of the video frame, the extending direction of the horizontal axis (also referred to as the u-axis or the x-axis) may be parallel to the row direction of pixels in the video frame, and the extending direction of the vertical axis may be parallel to the column direction of pixels in the video frame.

In the case of critically ensuring that the video obtained after compressing the two video frames before compression does not lose the object captured in the video before being compressed, within the time period between the recording times of the two adjacent video frames before compression, the travel distance of the target vehicle relative to the same object in the two adjacent video frames is the target distance threshold described above.

Figure 3:
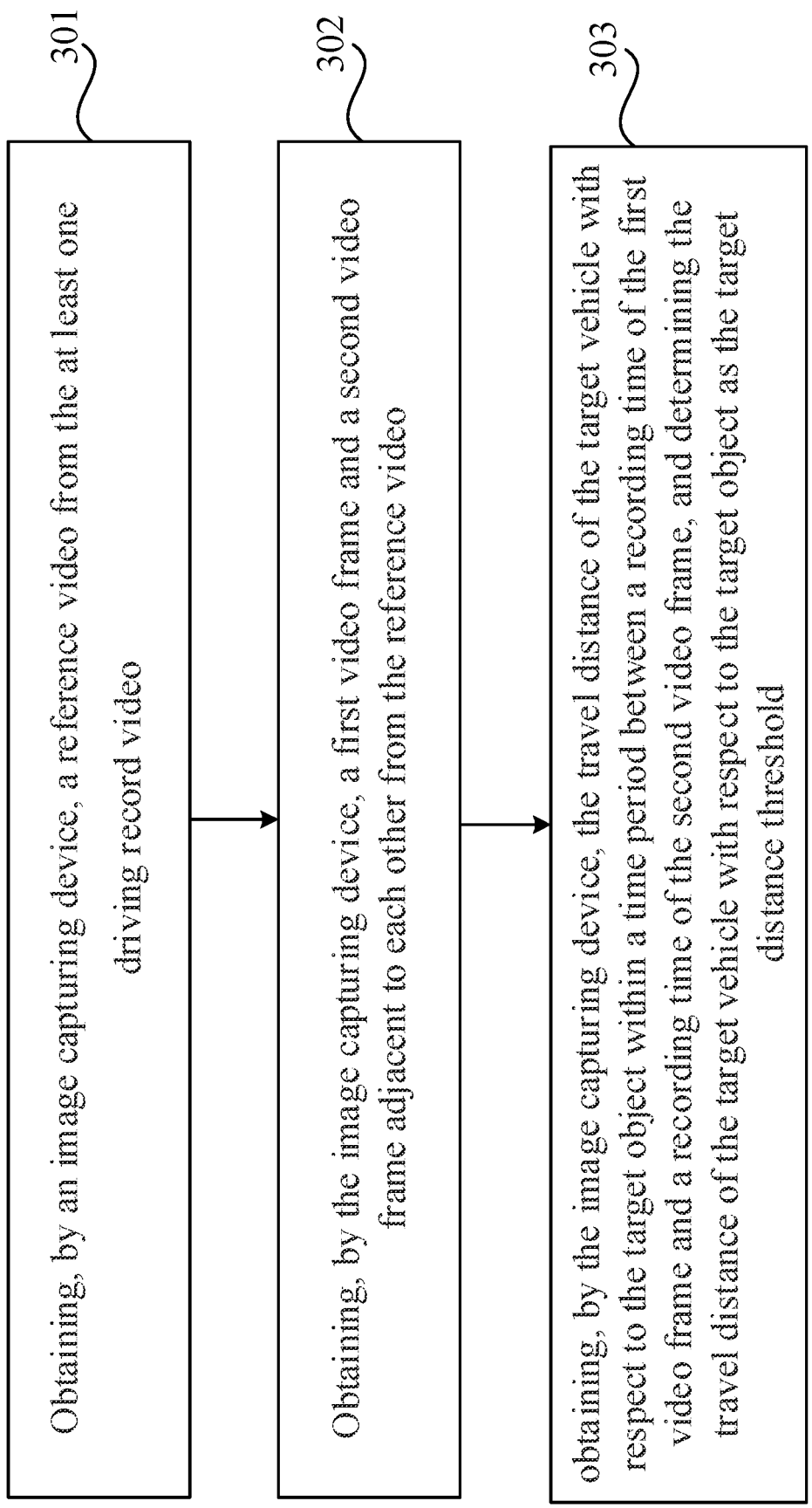
FIG. 3 is a flow chart of determining a target distance threshold according to an embodiment of the present disclosure.

In the embodiments of the present disclosure, the image capturing device may determine and store the target distance threshold in advance. When the first driving record video needs to be compressed, the image capturing device may directly obtain the pre-stored target distance threshold. FIG. 3 is a flow chart of a method for determining a target distance threshold according to an embodiment of the present disclosure. Referring to FIG. 3, the method may include the following steps.

In step 301, the image capturing device obtains a reference video from the at least one driving record video.

In order to calculate the target distance threshold described above, the image capturing device may obtain a reference video from at least one driving record video of the target vehicle stored in the storage space. That is, the reference video may be one driving record video of the target vehicle.

In step 302, the image capturing device obtains a first video frame and a second video frame adjacent to each other from the reference video.

The same target object is stored in the first video frame and the second video frame.

Optionally, the target object may be at the position just entering the picture in the first video frame. For example, the ordinate (e.g., the coordinate value on the v-axis) of the target object in the image coordinate system of the first video frame is smaller than a first coordinate threshold. The target object is at the position just going out of the picture in the second video frame. For example, the ordinate of the target object in the image coordinate system of the second video frame is greater than a second coordinate threshold.

In step 303, the image capturing device obtains the travel distance of the target vehicle with respect to the target object within a time period between the recording time of the first video frame and the recording time of the second video frame, and sets the travel distance of the target vehicle with respect to the target object as the target distance threshold.

In the embodiments of the present disclosure, the image capturing device can obtain, according to the coordinate value of the target object in the image coordinate system of the first video frame, the recording time of the first video frame, wherein the first depth value of the target object in the world coordinate system is z1. In addition, the image capturing device can obtain, according to the coordinate value of the target object in the image coordinate system of the second video frame, the recording time of the second video frame, wherein the second depth value of the target object in the world coordinate system is z2. Then, the imaging capturing device can determine the absolute value of the difference between the first depth value z1 and the second depth value z2 as the travel distance of the target vehicle with respect to the target object within the time period between the recording time of the first video frame and the recording time of the second video frame. That is, the target distance threshold $s_0$ may satisfy: $s_0=|z_1-z_2|$.

When the image capturing device is a binocular camera, the first depth value z1 and the second depth value z2 may be directly obtained by the image capturing device. When the imaging device is not a binocular camera, the first depth value z1 may be calculated by the image capturing device according to internal and external parameters thereof and the coordinate value of the target object in the image coordinate system of the first video frame; and the second depth value z2 may be calculated by the image capturing device according to the internal and external parameters thereof and the coordinate value of the target object in the image coordinate system of the second video frame.

Exemplarily, assuming that the coordinate value of the object in the video frame in the image coordinate system is (u, v), and the coordinate value of the object in the video frame in the world coordinate system is (x, y, z), the image capturing device can establish the following mathematical equation: z=f(u,v), based on the conversion relationship between the image coordinate system and the world coordinate system as well as the internal and external parameters of the image capturing device. f represents a transfer function between the depth value z of the object in the world coordinate system and the coordinate value (u, v) of the object in the image coordinate system.

Assuming that the coordinate value of the target object in the image coordinate system is (u0, v1) at the recording time of the first video frame, and the coordinate value of the target object in the image coordinate system is (u0, v2) at the recording time of the second video frame, the image capturing device may determine the travel distance of the target vehicle with respect to the target object within the time period between the recording time of the first video frame and the recording time of the second video frame. That is, the target distance threshold so is: $s_0=|f(u0,v1)-f(u0, v2)|$.

Figure 4:
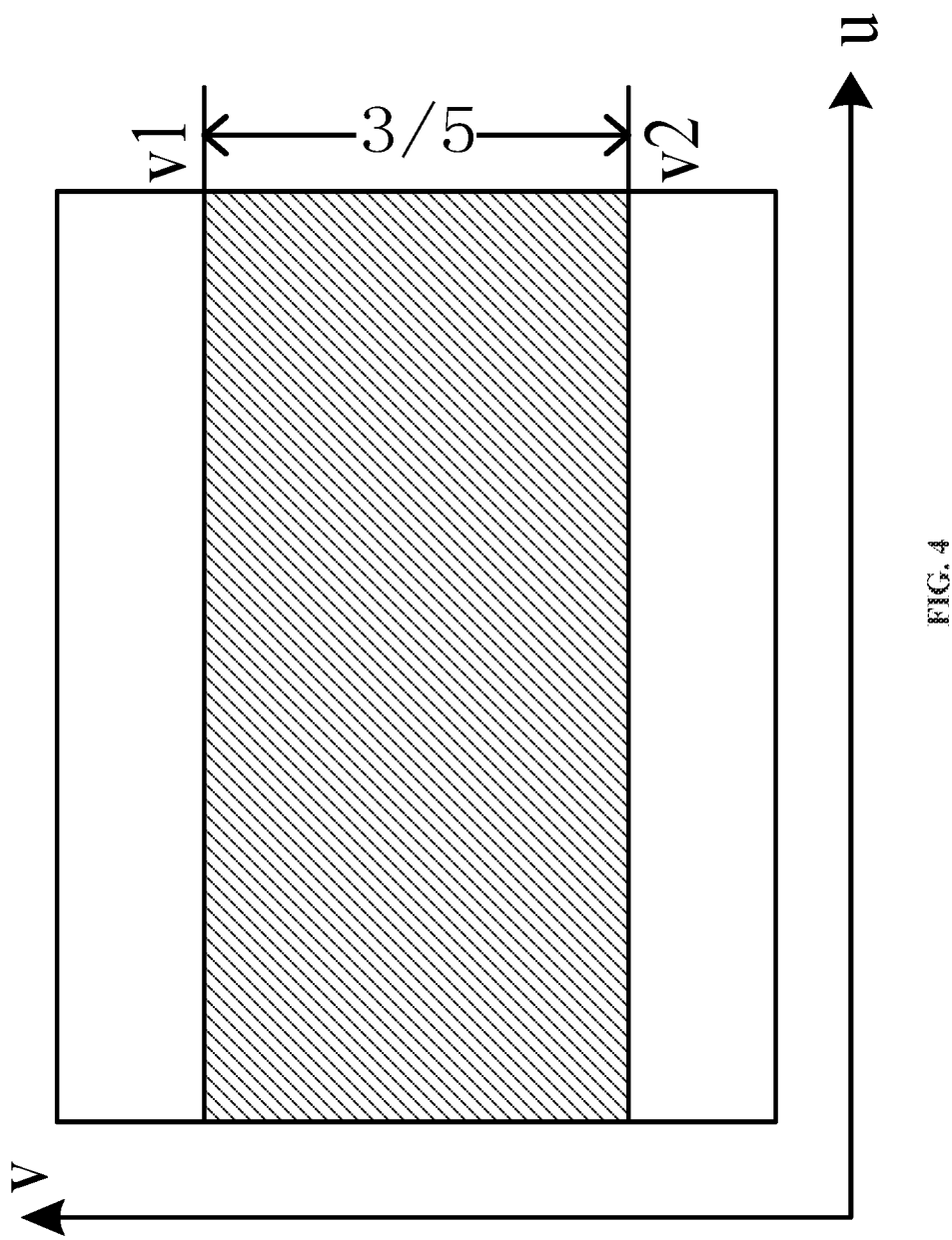
FIG. 4 is a schematic diagram of a video frame according to an embodiment of the present disclosure.

As shown in FIG. 4, since the optimal imaging position in the video frame is at one-third of a picture, a large distortion usually appears at the position too close to the top and bottom of the picture. Therefore, in the embodiments of the present disclosure, the top one-fifth of the video frame may be determined as the position just entering the picture described above, and the bottom one-fifth of the video frame may be determined as the position just going out of the picture described above. That is, the ordinate v1 at the top one-fifth of the video frame may be determined as the first coordinate threshold, and the ordinate v2 at the bottom one-fifth of the video frame may be determined as the second coordinate threshold.

In step 204, the image capturing device determines the number of segments according to the total travel distance of the target vehicle within the recording time period of the first driving record video and the target distance thresh.

The number n of the segments may satisfy: $n=\lceil s/s_0 \rceil$, or $n=\lfloor s/s_0 \rfloor$, where $\lceil \ \rceil$ represents rounding up to an integer, and $\lfloor \ \rfloor$ represents rounding down to an integer. s is the total travel distance of the target vehicle within the recording time period of the first driving record video, and so is the target distance threshold.

Optionally, the image capturing device may query the historical driving record of the target vehicle according to the recording time period of the first driving record video to obtain the travel speed of the target vehicle in the recording time period of the first driving record video, and thus calculates the total travel distance according to the travel speed.

The travel speed obtained by the image capturing device may include: the travel speed of the target vehicle at the recording time of each video frame in the first driving record video. Alternatively, the travel speed obtained by the image capturing device may be a real-time speed of the target vehicle within the recording time period of the first driving record video. For example, the image capturing device may obtain a travel speed curve of the target vehicle within the recording time period of the first driving record video.

Exemplarily, assuming that the total travel distance of the target vehicle within the recording time period of the first driving record video is 5000 meters and the target distance threshold is 100 meters, the image capturing device may determine that the number of segments n is 50. That is, the first driving record video may be divided into 50 video segments. Alternatively, assuming that the total travel distance of the target vehicle within the recording time period of the first driving record video is 4500 meters and the target distance threshold is 100 meters, the image capturing device may determine that the number of segments n is 45, or may determine that the number of the segments n is 46.

In step 205, the image capturing device determines, according to the target distance threshold, the travel distance range that each of the n video segments corresponds to.

The travel distance range that the $i^{th}$ video segment corresponds to may be $((i-1) \times s_0, i \times s_0]$, wherein i is a positive integer less than or equal to n. For example, for the first video segment, the corresponding travel distance range may be $(0, s_0]$. For the second video segment, the corresponding travel distance range may be $(s_0, 2 \times s_0]$.

In step 206, for each of the video frames included in the first driving record video, the image capturing device determines the vehicle travel distance that the video frame corresponds to.

The vehicle travel distance that each video frame corresponds to is the travel distance of the target vehicle within the time period between the start recording time of the first vehicle record video and the recording time of the video frame.

Optionally, the vehicle travel distance that each video frame corresponds to may be determined by the image capturing device according to the recording time of the video frame and the travel speed of the target vehicle.

Figure 5:
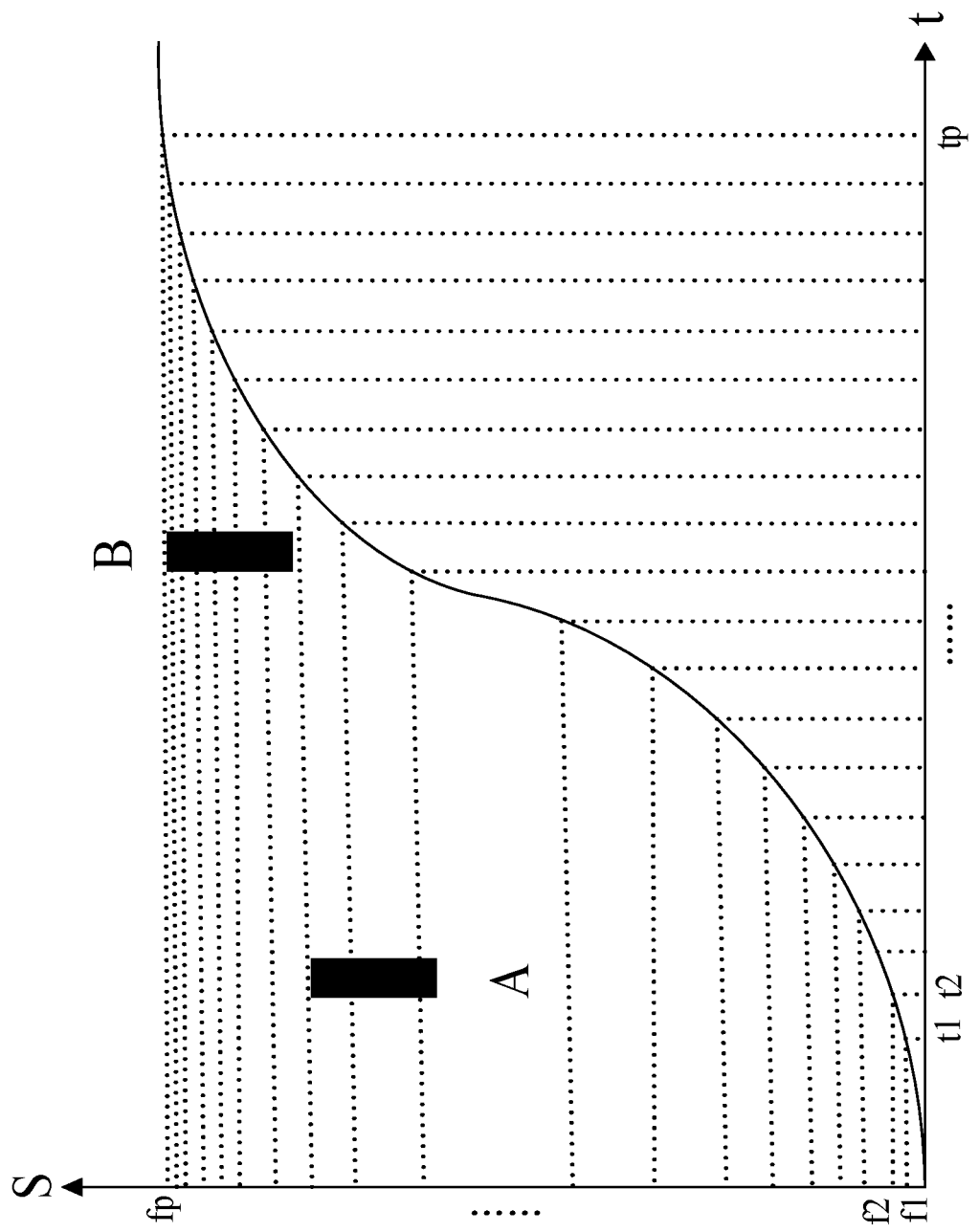
FIG. 5 is a schematic diagram showing a travel distance change over time according to an embodiment of the present disclosure.

FIG. 5 is a curve showing the change of a travel distance S of the target vehicle with time t within a target time period. The image capturing device may first determine the recording time of each video frame included in the first driving record video. For example, in FIG. 5, the recording times of p video frames included in the first driving record video are t1, t2, . . . , and tp, respectively. Then, the image capturing device may obtain the travel distance of the target vehicle with respect to the start recording time of the first driving record video during recording of each video frame according to the recording time of the video frame and the curve of the change of the travel distance S with time t. That is, the vehicle travel distance that each video frame corresponds to can be obtained. As shown in FIG. 5, the vehicle travel distances that the p video frames correspond to may be f1, f2, . . . , and fp, respectively.

In step 207, for each video frame included in the first driving record video, the image capturing device groups a video frame into the $i^{th}$ video segment when detecting that the vehicle travel distance that the video frame corresponds to is within the travel distance range that the $i^{th}$ video segment corresponds to.

In the embodiments of the present disclosure, the image capturing device may sequentially detect the travel distance range within which the vehicle travel distance that each video frame corresponds to is from the first video frame in the first driving record video. When it is detected that a video frame is within the travel distance range that the $i^{th}$ video segment corresponds to, the video frame may be grouped into the $i^{th}$ video segment. After all video frames included in the first driving record video are grouped, the image capturing device can obtain n video segments.

Optionally, the image capturing device may also sequentially detect the travel distance range within which the vehicle travel distance that each video frame corresponds to is from the last video frame in the first driving record video. Alternatively, the image capturing device may also randomly detect the travel distance range within which the vehicle travel distance that each of the plurality of video frames included in the first driving record video corresponds to is. The detection sequence of the video frame by the image capturing device is not limited in the embodiments of the present disclosure, and all that is needed is to ensure that all the video frames in the first driving record video are detected.

For example, please continue to refer to FIG. 5, assuming that in the first driving record video, the vehicle travel distance f1 that the first video frame corresponds to and the vehicle travel distance f2 that the second video frame corresponds to are both greater than 0 and less than so, the first video frame and the second video frame can be grouped into the first video segment of the n video segments. Assuming that the vehicle travel distance f7 that the seventh video frame corresponds to is greater than so and less than $2 \times s_0$, the seventh video frame may be grouped into the second video segment of the n video segments.

It should be noted that if the vehicle travel distance that a video frame (for example, the first video frame) in the first driving record video corresponds to is equal to 0, the video frame may be grouped into the first video segment. That is, the travel distance range that the first video segment corresponds to may be extended to $[0, s_0]$.

In step 208, for each of the video segments in the first driving record video, the image capturing device deletes at least one video frame from the video frames included in the video segment when the number of video frames included in the video segment is greater than the target image frame number threshold, to obtain a second driving record video.

The number of video frames included in the video segment after deleting the video frame may be equal to the target image frame number threshold. As can be seen from the above description, in the case where one video segment includes two video frames, it can be ensured that the same object is stored in any two adjacent video frames of the video after being compressed (that is, the second driving record video described below).

Therefore, when the number of the video frames included in the video segment is greater than the target image frame number threshold (the target image frame number threshold may be 2), the video frames in the video segment may be deleted, as long as it is ensured that the number of video frames included in the video segment after deleting the video frames is equal to the target image frame number threshold. It can be ensured that the second driving record video does not lose the object captured in the first driving record video. However, when the number of video frames included in the video segment is not greater than the target image frame number threshold, the video frames in the video segment cannot be deleted. Otherwise, it cannot be ensured that the second driving record video does not lose the object captured in the first driving record video.

With continued reference to FIG. 5, the rectangular frame A in FIG. 5 represents one of the n video segments, and the rectangular frame B represents another one of the n video segments. As shown in FIG. 5, since the video segment represented by the rectangular frame A includes only two video frames, the video frames in the video segment represented by the rectangular frame A cannot be deleted; and since the number of video frames included in the video segment represented by the rectangular frame B is greater than 2, the video frames in the video segment represented by the rectangular frame B can be deleted.

In the embodiments of the present disclosure, when the number of video frames included in a certain video segment is greater than the target image frame number threshold, as an optional implementation, the image capturing device may delete at least one video frame, except the first record video frame and the last record video frame, from the video frames included in the video segment. For example, the video frames except the first video frame and the last video frame may be deleted.

In order to ensure a clearer and smoother image of the driving record video, the image capturing device may record the same object (such as a building) through a plurality of video frames when capturing the images, so that the clarity and the smoothness of the image can be improved. However, when the storage space is insufficient, if it is intended to record a general image capturing path or object in the driving record videos, it needs to sacrifice the quality and the smoothness to obtain the storage space for the driving record video. Therefore, deleting the video frames except the first video frame and the last video frame in the video segment not only ensures the integrity of the object recorded by the video segment, but also saves the storage space.

When the number of video frames included in a certain video segment is greater than the target image frame number threshold, as another alternative implementation, the image capturing device may delete at least one video frame from the video frames included in the video segment except the start recording video frame and the end recording video frame. For example, all video frames except the start recording video frame and the end recording video frame may be deleted.

The start recording video frame includes at least one object that appears in the video segment for the first time, and the end recording video frame includes at least one object that appears in the video segment for the last time. That is, the start recording video frame is the video frame that first records an object in the video segment in, and the end recording video frame is the video frame that last records an object in the video segment.

Exemplarily, assuming that in a certain video segment, object A appears in the first to the sixth video frames, and object B appears in the fourth to the tenth video frames, it means that the first video frame is the video frame that first records object A in the video segment, and the sixth video frame is the video frame that last records object A in the video segment, and the fourth video frame is the video frame that first records object B in the video segment, and the tenth video frame is the video frame that last records object B in the video segment. Thus, the image capturing device can retain only the first video frame, the fourth video frame, the sixth video frame, and the tenth video frame, and delete other video frames.

When the number of video frames included in a certain video segment is greater than the target image frame number threshold, as yet another alternative implementation, the image capturing device may randomly delete at least one video frame from the video frames included in the video segment.

In the embodiments of the present disclosure, after the image capturing device detects all the video segments included in the first driving record video and deletes redundant video frames, the second driving record video is obtained. Within the time period between the recording times of any two adjacent video frames of the second driving record video, the travel distance of the target vehicle is less than or equal to the target distance threshold.

Optionally, after the number of video frames included in each video segment is reduced to the target image frame number threshold, if the image capturing device detects that the capacity of available space of the storage space is still smaller than the target capacity threshold, the image capturing device may further delete the driving record video which is compressed and recorded at the earliest except the target driving record video according to the recording time sequence of the driving record videos to obtain more available space.

In different application scenarios, there may be a scenario that the same object is recorded in all video frames in the driving record video. If the lens of the driving recorder is tilted to the downside, the driving record video may always contain a part of the vehicle head. For this application scenario, the embodiments of the present disclosure provide an exception processing solution. If it is detected that an object including a part of the vehicle head is always present in the video frames, prompt information is output to prompt the driver to adjust the angle of the driving recorder so as to avoid influence on the processing of the driving record video.

In summary, according to the video management method provided in the embodiments of the present disclosure, a first driving record video is obtained from storage space when the capacity of available space of the storage space is less than the target capacity threshold, and at least one video frame is deleted from a plurality of video frames included in the first driving record video to obtain a second driving record video. Objects captured in the first driving record video are in the second driving record video. Thus, on one hand, the capacity occupied by the first driving record video in the storage space can be reduced by deleting at least one video frame of the first driving record video, so as to increase the capacity of available space of the storage space. On the other hand, objects captured in the first driving record video are in the second driving record video, so that user information safety is ensured.

Figure 6:
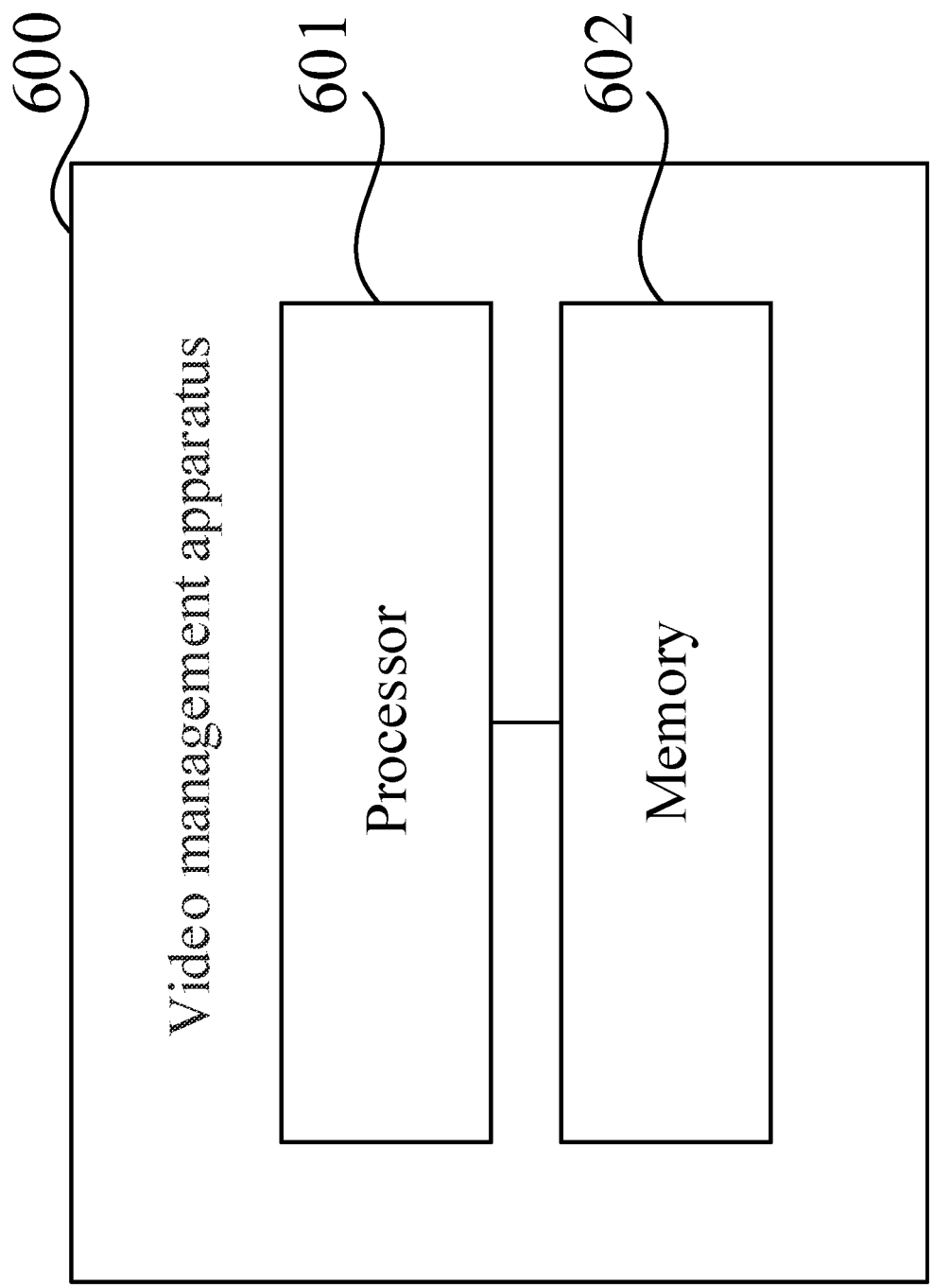
FIG. 6 is a block diagram of a video management apparatus according to an embodiment of the present disclosure.

FIG. 6 is a schematic block diagram of a video management apparatus 600 according to an embodiment of the present disclosure. As shown in FIG. 6, the video management apparatus 600 includes a processor 601 and a memory 602. It should be noted that although only one processor 601 is shown in FIG. 6, the video management apparatus 600 may include one or more processors 601 in actual implementation.

The memory 602 stores one or more programs configured to be executed by the one or more processors 601. The one or more programs include instructions for performing the following operations: obtaining a first driving record video from storage space when a capacity of available space of the storage space is less than a target capacity threshold, wherein the storage space stores at least one driving record video of a target vehicle, and the first driving record video includes a plurality of video frames; and deleting at least one video frame from the plurality of video frames included in the first driving record video to obtain a second driving record video, wherein objects captured in the first driving record video are in the second driving record video.

In an embodiment of the present disclosure, the one or more programs include instructions for performing the following operations: dividing the first driving record video into n video segments, wherein within a recording time period of each of the video segments, the travel distance of the target vehicle is less than or equal to a target distance threshold, the target distance threshold is a vehicle critical travel distance which ensures that objects captured in the first driving record video are in the second driving record video, and n is a positive integer greater than one; and for each of the video segments, deleting at least one video frame from the video frames included in the video segment when the number of video frames included in the video segment is greater than a target image frame number threshold, where the number of video frames included in the video segment after deleting the video frame is equal to the target image frame number threshold.

In an embodiment of the present disclosure, the one or more programs include instructions for performing the following operations: determining, according to the total travel distance s of the target vehicle within the recording time period of the first driving record video and the target distance threshold $s_0$, the number of segments n, wherein n satisfies: $n=\lceil s/s_0 \rceil$ $n=\lfloor s/s_0 \rfloor$, $\lceil\ \rceil$ indicates rounding up to an integer, and $\lfloor\ \rfloor$ indicates rounding down to an integer; determining, according to the target distance threshold $s_0$, a travel distance range that each of the n video segments corresponds to, wherein the travel distance range that the $i^{th}$ video segment corresponds to is $((i-1)\times s_0, i\times s_0]$, and i is a positive integer less than or equal to n; for each video frame included in the first driving record video, determining the vehicle travel distance that the video frame corresponds to, wherein the vehicle travel distance that the video frame corresponds to is the travel distance of the target vehicle within a time period between a start recording time of the first vehicle record video and a recording time of the video frame; and for each video frame included in the first driving record video, grouping the video frame into the $i^{th}$ video segment when it is detected that the vehicle travel distance that the video frame corresponds to is within the travel distance range that the $i^{th}$ video segment corresponds to.

In an embodiment of the present disclosure, the target image frame number threshold is two.

In an embodiment of the present disclosure, the one or more programs include instructions for performing the following operations: deleting at least one video frame from the video frames included in the video segment except the first video frame and the last video frame in the video segment.

In an embodiment of the present disclosure, the one or more programs include instructions for performing the following operations: deleting at least one video frame from the video frames included in the video segment except the start recording video frame and the end recording video frame in the video segment, wherein the start recording video frame is the video frame that first records an object in the video segment; and the end recording video frame is the video frame that last records an object in the video segment.

In an embodiment of the present disclosure, the one or more programs include instructions for performing the following operations: randomly deleting at least one video frame from the video frames included in the video segment.

In an embodiment of the present disclosure, the one or more programs include instructions for performing the following operations: obtaining a reference video from the at least one driving record video; obtaining a first video frame and a second video frame which are adjacent from the reference video, where the first video frame and the second video frame include the same target object; obtaining the travel distance of the target vehicle with respect to the target object within a time period between the recording time of the first video frame and the recording time of the second video frame; and setting the travel distance of the target vehicle with respect to the target object as the target distance threshold.

Optionally, the ordinate of the target object in the image coordinate system of the first video frame is less than a first coordinate threshold, the ordinate of the target object in the image coordinate system of the second video frame is greater than the second coordinate threshold, and the second coordinate threshold is greater than the first coordinate threshold.

In an embodiment of the present disclosure, the one or more programs may further include instructions for performing the following operations: obtaining, according to the coordinate value of the target object in the image coordinate system of the first video frame, a first depth value of the target object in the world coordinate system at the recording time of the first video frame; obtaining, according to the coordinate value of the target object in the image coordinate system of the second video frame, a second depth value of the target object in the world coordinate system at the recording time of the second video frame; and setting the absolute value of the difference between the first depth value and the second depth value as the travel distance of the target vehicle with respect to the target object within the time period between the recording time of the first video frame and the recording time of the second video frame.

In an embodiment of the present disclosure, a target video to which an incompressible identifier is added is stored in the storage space; and the one or more programs include instructions for performing the following operation: obtaining the first driving record video from driving record videos except the target driving record video in the storage space.

In an embodiment of the present disclosure, the one or more programs include instructions for performing the following operations: detecting, during recording of the video, whether the capacity of available space of the storage space is less than a target capacity threshold.

In summary, according to the video management apparatus provided in the embodiments of the present disclosure, a first driving record video is obtained from storage space when the capacity of available space of the storage space is less than the target capacity threshold, and at least one video frame is deleted from a plurality of video frames included in the first driving record video to obtain a second driving record video, wherein the objects captured in the first driving record video are in the second driving record video. Thus, on one hand, the capacity occupied by the first driving record video in the storage space can be reduced by deleting at least one video frame of the first driving record video, so as to increase the capacity of available space of the storage space. On the other hand, objects captured in the first driving record video are in the second driving record video, so that user information safety is ensured.

In an embodiment of the present disclosure, there is also provided an image capturing device. The image capturing device includes any of the above video processing apparatus and an image capturing component.

In an embodiment of the present disclosure, there is also provided a computer readable storage medium. The computer readable storage medium is a non-volatile storage medium having at least one instruction, at least one program, a code set, or an instruction set stored therein. The at least one instruction, the at least one program, the code set, or the instruction set are loaded and executed by a processor to implement the video management method provided by the above-described embodiments of the present disclosure.

In an embodiment of the present disclosure, there is also provided a computer program product storing instructions. When the computer program product operates on a computer, the computer is caused to perform the video management method provided by an embodiment of the present disclosure.

In an embodiment of the present disclosure, there is also provided a chip, including programmable logic circuits and/or program instructions. When the chip is in operation, the video management method provided by the embodiments of the present disclosure can be executed.

It should be appreciated by those skilled in the art that, the embodiments of the present disclosure may be provided as methods, systems or computer program products. Therefore, whole hardware embodiments, whole software embodiments or a combination thereof may be adopted in the present disclosure. In addition, the present disclosure adopts one or more computer program products that may be implemented by computer storage mediums (include but are not limited to disk storage, CD-ROM, optical storage, etc.) including computer program codes.

The present disclosure is described with reference to the flowcharts and/or block diagrams of the method, the device (system) and the computer program product according to the embodiments of the present disclosure. It should be understood that each process and/or block in the flowcharts and/or block diagrams, and combinations of processes and/or blocks in the flowcharts and/or block diagrams, may be realized by computer program instructions. These computer program instructions may be provided to a generate-purpose computer, a special-purpose computer, an embedded processor, or processors of other programmable data processing devices, so as to create a machine, such that an apparatus for realizing functions designated in one or more processes in the flowcharts and/or in one or more blocks in the block diagrams, may be created by instructions performed by a computer or processors of other programmable data processing devices.

These computer program instructions may further be stored in a computer readable storage that can boot a computer or other programmable data processing devices to work in a specific way, such that a manufactured product containing an instruction apparatus may be created by the instructions stored in the computer readable storage, and the instruction apparatus realizes the functions designated in one or more processes in the flowcharts and/or in one or more blocks in the block diagrams.

These computer program instructions may further be loaded into a computer or other programmable data processing devices, such that a series of operating steps may be performed on the computer or other programmable data processing devices, so as to generate processes realized by the computer, such that steps for realizing the functions designated in one or more processes in the flowcharts and/or in one or more blocks in the block diagrams may be provided by the instructions executed on the computer or other programmable data processing devices.

In a typical configuration, a computing device includes one or more processors (CPUs), input/output interfaces, network interfaces, and memories.

The memory may include computer readable medium in the form of non-persistent memory, random access memory (RAM), and/or non-volatile memory, such as read only memory (ROM) or flash random access memory (flash RAM). The memory is an example of the computer readable medium.

The computer readable medium includes both persistent and non-persistent and removable and non-removable media that may be implemented in any method or technology for storage of information. The information may be computer readable instructions, data structures, program modules or other data. Examples of the computer storage medium includes, but is not limited to, phase-change RAM (PRAM), static random access memory (SRAM), dynamic random access memory (DRAM), other types of random access memory (RAM), read only memory (ROM), electrically erasable programmable read only memory (EEPROM), flash memory or other memory technology, compact disk read only memory (CD-ROM), digital versatile disk (DVD) or other optical storage, magnetic cassettes, magnetic tape, magnetic disk storage or other magnetic storage devices, or any other non-transmission medium that can be used to store information for access by a computing device. As defined herein, the computer readable medium does not include transitory computer readable media, such as modulated data signals and carrier waves.

It should also be noted that the terms "comprise", "include", "contain", or any other variants are intended to cover the nonexclusive containing, such that the processes, methods, commodities or devices including a series of elements not only include those elements, but also include other unclearly listed elements, or also include the inherent elements of such processes, methods, commodities or devices. Without more limitations, the element defined by the phrase "including a . . . " does not exclude the existence of other same elements in the process, method, commodity, or device that including such element.

The foregoing descriptions are merely exemplary embodiments of the present disclosure, and are not intended to limit the present disclosure. Persons of ordinary skill in the art may make various changes and variations to the present disclosure. Within the spirit and principles of the disclosure, any modifications, equivalent substitutions, improvements, etc., are within the protection scope of the claims of the present disclosure.

What is claimed is:

1. A video management method, comprising:
    obtaining a first driving record video from storage space when a capacity of available space of the storage space is less than a target capacity threshold, wherein the storage space stores at least one driving record video of a target vehicle, the first driving record video is one of the at least one driving record video, and the first driving record video comprises a plurality of video frames; and
    deleting at least one video frame from the plurality of video frames included in the first driving record video to obtain a second driving record video,
    wherein objects captured in the first driving record video are in the second driving record video,
    wherein deleting at least one video frame from the plurality of video frames included in the first driving record video comprises:
        dividing the first driving record video into n video segments, wherein within a recording time period of each of the video segments, a travel distance of the target vehicle is less than or equal to a target distance threshold, the target distance threshold is a vehicle critical travel distance which ensures that the objects captured in the first driving record video are in the second driving record video, and n is a positive integer greater than one; and
        for each of the video segments, deleting at least one video frame from the video frames included in the video segment when the number of video frames included in the video segment is greater than a target image frame number threshold, the number of video frames included in the video segment after deleting the video frame being equal to the target image frame number threshold, and
    wherein dividing the first driving record video into n video segments comprises:
        determining, according to a total travel distance s of the target vehicle within a recording time period of the first driving record video and the target distance threshold $s_0$, the number of segments n, wherein n satisfies: $n=\lceil s/s_0 \rceil$ or $n=\lfloor s/s_0 \rfloor$, $\lceil \ \rceil$ indicates rounding up to an integer, and $\lfloor \ \rfloor$ indicates rounding down to an integer;
        determining, according to the target distance threshold $s_0$, a travel distance range that each of the n video segments corresponds to, wherein the travel distance range that the $i^{th}$ video segment corresponds to is $((i-1) \times s_0, i \times s_0]$, and i is a positive integer less than or equal to n;
        for each video frame included in the first driving record video, determining a vehicle travel distance that the video frame corresponds to, wherein the vehicle travel distance that the video frame corresponds to is the travel distance of the target vehicle within a time period between a start recording time of the first vehicle record video and a recording time of the video frame; and
        for each video frame included in the first driving record video, grouping the video frame into the $i^{th}$ video segment when it is detected that a vehicle travel distance that the video frame corresponds to is within the travel distance range that the $i^{th}$ video segment corresponds to.

2. The method according to claim 1, wherein the target image frame number threshold is two.

3. The method according to claim 1, wherein deleting at least one video frame from the video frames included in the video segment comprises:
    deleting at least one video frame, except a first video frame and a last video frame, from the video frames included in the video segment.

4. The method according to claim 1, wherein deleting at least one video frame from the video frames included in the video segment comprises:
    deleting at least one video frame, except a start recording video frame and an end recording video frame, from the video frames included in the video segment,
    wherein the start recording video frame comprises at least one object that appears in the video segment for the first time, and the end recording video frame comprises at least one object that appears in the video segment for the last time.

5. The method according to claim 1, wherein prior to deleting at least one video frame from the plurality of video frames included in the first driving record video, the method further comprises:
    obtaining a reference video from the at least one driving record video;
    obtaining a first video frame and a second video frame adjacent to each other from the reference video, the first video frame and the second video frame comprising the same target object;
    obtaining the travel distance of the target vehicle with respect to the target object within a time period between a recording time of the first video frame and a recording time of the second video frame; and
    setting the travel distance of the target vehicle with respect to the target object as the target distance threshold.

6. The method according to claim 5, wherein an ordinate of the target object in an image coordinate system of the first video frame is less than a first coordinate threshold; an ordinate of the target object in an image coordinate system of the second video frame is greater than a second coordinate threshold; and the second coordinate threshold is greater than the first coordinate threshold.

7. The method according to claim 5, wherein obtaining the travel distance of the target vehicle with respect to the target object within the time period between the recording time of the first video frame and the recording time of the second video frame comprises:
    obtaining, according to a coordinate value of the target object in the image coordinate system of the first video frame, a first depth value of the target object in a world coordinate system at the recording time of the first video frame;
    obtaining, according to a coordinate value of the target object in the image coordinate system of the second video frame, a second depth value of the target object in the world coordinate system at the recording time of the second video frame; and
    setting an absolute value of a difference between the first depth value and the second depth value as the travel distance of the target vehicle with respect to the target object within the time period between the recording time of the first video frame and the recording time of the second video frame.

8. The method according to claim 1, wherein a target driving record video to which an incompressible identifier is added is stored in the storage space; and obtaining the first driving record video from the storage space comprises:
  obtaining the first driving record video from driving record videos except the target driving record video in the storage space.

9. The method according to claim 1, wherein prior to obtaining the first driving record video from the storage space when the capacity of available space of the storage space is less than the target capacity threshold, the method further comprises:
  detecting, during recording of the driving record video, whether the capacity of available space of the storage space is less than the target capacity threshold.

10. A video management apparatus, comprising:
  one or more processors; and
  a memory, wherein
  the memory stores one or more programs configured to be executed by the one or more processors, and the one or more programs comprise instructions for performing the following operations:
  obtaining a first driving record video from storage space when a capacity of available space of the storage space is less than a target capacity threshold, wherein the storage space stores at least one driving record video of a target vehicle, and the first driving record video comprises a plurality of video frames; and
  deleting at least one video frame from the plurality of video frames included in the first driving record video to obtain a second driving record video,
  wherein objects captured in the first driving record video are in the second driving record video,
  wherein the one or more programs comprise instructions for performing the following operations:
    dividing the first driving record video into n video segments, wherein within a recording time period of each of the video segments, a travel distance of the target vehicle is less than or equal to a target distance threshold, the target distance threshold is a vehicle critical travel distance which ensures that the objects captured in the first driving record video are in the second driving record video, and n is a positive integer greater than one; and
    for each of the video segments, deleting at least one video frame from the video frames included in the video segment when the number of video frames included in the video segment is greater than a target image frame number threshold, the number of video frames included in the video segment after deleting the video frame being equal to the target image frame number threshold, and
  wherein the one or more programs comprise instructions for performing the following operations:
    determining according to a total travel distance s of the target vehicle within a recording time period of the first driving record video and the target distance threshold $s_0$, the number of segments n, wherein n satisfies: $n=\lceil s/s_0 \rceil$ or $n=\lfloor s/s_0 \rfloor$, $\lceil \ \rceil$ indicates rounding up to an integer, and $\lfloor \ \rfloor$ indicates rounding down to an integer;
    determining, according to the target distance threshold $s_0$, a travel distance range that each of the n video segments corresponds to, wherein the travel distance range that the $i^{th}$ video segment corresponds to is $((i-1) \times s_0, i \times s_0]$, and i is a positive integer less than or equal to n;
    for each video frame included in the first driving record video, determining a vehicle travel distance that the video frame corresponds to, wherein the vehicle travel distance that the video frame corresponds to is the travel distance of the target vehicle within a time period between a start recording time of the first vehicle record video and a recording time of the video frame; and
    for each video frame included in the first driving record video, grouping the video frame into the $i^{th}$ video segment when it is detected that a vehicle travel distance that the video frame corresponds to is within the travel distance range that the $i^{th}$ video segment corresponds to.

11. The apparatus according to claim 10, wherein the target image frame number threshold is two.

12. The apparatus according to claim 10, wherein the one or more programs comprise instructions for performing the following operations:
  deleting at least one video frame, except a first video frame and a last video frame, from the video frames included in the video segment.

13. The apparatus according to claim 2, wherein the one or more programs comprise instructions for performing the following operations:
  randomly deleting at least one video frame from the video frames included in the video segment.

14. The apparatus according to claim 10, wherein the one or more programs further comprise instructions for performing the following operations:
  obtaining a reference video from the at least one driving record video;
  obtaining a first video frame and a second video frame adjacent to each other from the reference video, the first video frame and the second video frame comprising the same target object;
  obtaining a travel distance of the target vehicle with respect to the target object within a time period between a recording time of the first video frame and a recording time of the second video frame; and
  setting the travel distance of the target vehicle with respect to the target object as the target distance threshold.

15. An image capturing device, comprising: a video management apparatus and an image capturing component, wherein the video management apparatus comprises:
  one or more processors; and
  a memory, wherein
  the memory stores one or more programs configured to be executed by the one or more processors, and the one or more programs comprise instructions for performing the following operations:
  obtaining a first driving record video from storage space when a capacity of available space of the storage space is less than a target capacity threshold, wherein the storage space stores at least one driving record video of a target vehicle, and the first driving record video comprises a plurality of video frames; and
  deleting at least one video frame from the plurality of video frames included in the first driving record video to obtain a second driving record video,
  wherein objects captured in the first driving record video are in the second driving record video,
  wherein deleting at least one video frame from the plurality of video frames included in the first driving record video comprises:

dividing the first driving record video into n video segments, wherein within a recording time period of each of the video segments, a travel distance of the target vehicle is less than or equal to a target distance threshold, the target distance threshold is a vehicle critical travel distance which ensures that the objects captured in the first driving record video are in the second driving record video, and n is a positive integer greater than one; and for each of the video segments, deleting at least one video frame from the video frames included in the video segment when the number of video frames included in the video segment is greater than a target image frame number threshold, the number of video frames included in the video segment after deleting the video frame being equal to the target image frame number threshold, and wherein dividing the first driving record video into n video segments comprises:

determining according to a total travel distance s of the target vehicle within a recording time period of the first driving record video and the target distance threshold $s_0$, the number of segments n, wherein n satisfies: $n=\lceil s/s_0 \rceil$ or $n=\lfloor s/s_0 \rfloor$, $\lceil \ \rceil$ indicates rounding up to an integer, and $\lfloor \ \rfloor$ indicates rounding down to an integer;

determining, according to the target distance threshold $s_0$, a travel distance range that each of the n video segments corresponds to, wherein the travel distance range that the $i^{th}$ video segment corresponds to is $((i-1) \times s_0, i \times s_0]$, and i is a positive integer less than or equal to n;

for each video frame included in the first driving record video, determining a vehicle travel distance that the video frame corresponds to, wherein the vehicle travel distance that the video frame corresponds to is the travel distance of the target vehicle within a time period between a start recording time of the first vehicle record video and a recording time of the video frame; and for each video frame included in the first driving record video, grouping the video frame into the $i^{th}$ video segment when it is detected that a vehicle travel distance that the video frame corresponds to is within the travel distance range that the $i^{th}$ video segment corresponds to.

16. A computer-readable storage medium, having stored thereon instructions that, when executed on a processor of the computer, cause the processor to perform the video management method according to claim 1.

* * * * *